United States Patent
Ma et al.

(10) Patent No.: US 12,493,691 B2
(45) Date of Patent: *Dec. 9, 2025

(54) UTILIZING MACHINE LEARNING FOR SMART QUARANTINING OF POTENTIALLY MALICIOUS FILES

(71) Applicant: Zscaler, Inc., San Jose, CA (US)

(72) Inventors: Changsha Ma, Campbell, CA (US);
Rex Shang, Los Altos, CA (US);
Douglas A. Koch, Santa Clara, CA (US);
Dianhuan Lin, Sunnyvale, CA (US);
Howie Xu, Palo Alto, CA (US);
Bharath Kumar, Bengaluru (IN);
Shashank Gupta, San Jose, CA (US);
Parnit Sainion, San Jose, CA (US);
Narinder Paul, Sunnyvale, CA (US);
Deepen Desai, San Ramon, CA (US)

(73) Assignee: Zscaler, Inc., San Jose, CA (US)

(*) Notice: Subject to any disclaimer, the term of this patent is extended or adjusted under 35 U.S.C. 154(b) by 72 days.

This patent is subject to a terminal disclaimer.

(21) Appl. No.: 18/363,231

(22) Filed: Aug. 1, 2023

(65) Prior Publication Data

US 2023/0376592 A1 Nov. 23, 2023

Related U.S. Application Data

(63) Continuation of application No. 16/902,759, filed on Jun. 16, 2020, now Pat. No. 11,755,726, and a (Continued)

(51) Int. Cl.
*G06F 21/00* (2013.01)
*G06F 21/53* (2013.01)
(Continued)

(52) U.S. Cl.
CPC ............ *G06F 21/554* (2013.01); *G06F 21/53* (2013.01); *G06N 5/04* (2013.01); *G06N 20/00* (2019.01); *G06F 2221/033* (2013.01)

(58) Field of Classification Search
CPC .. G06F 21/554; G06F 21/53; G06F 2221/033; G06F 21/56; G06N 5/04; G06N 20/00; G06N 5/01; G06N 20/20
See application file for complete search history.

(56) References Cited

U.S. PATENT DOCUMENTS 9,152,789 B2 10/2015 Natarajan et al.
10,073,968 B1 9/2018 Magar
(Continued)

OTHER PUBLICATIONS

Jordaney, Roberto, et al. "Transcend: Detecting concept drift in malware classification models." 26th {USENIX} Security Symposium ({USENIX} Security 17). 2017.
(Continued)

*Primary Examiner* — Ghazal B Shehni
(74) *Attorney, Agent, or Firm* — Baratta Law PLLC; Lawrence A. Baratta, Jr.; Ryan Odessa (57) ABSTRACT

Systems and methods of sandboxing a file include responsive to receiving a file associated with a user, obtaining policy for the user; analyzing the file with a machine learning model; and based on a combination of the policy for the user and a verdict of the machine learning model, one of quarantining the file for analysis in a sandbox and allowing the file to the user. The present disclosure presents a smart quarantine with a goal of minimizing the number of files quarantined, the number of malicious files passed through to an end user, and a number of files scanned by a sandbox.

16 Claims, 8 Drawing Sheets

Related U.S. Application Data continuation-in-part of application No. 16/377,129, filed on Apr. 5, 2019, now Pat. No. 11,669,779.

(51) Int. Cl.
  *G06F 21/55* (2013.01)
  *G06N 5/04* (2023.01)
  *G06N 20/00* (2019.01)

(56) References Cited

U.S. PATENT DOCUMENTS

| | | | |
|---|---|---|---|
| 2013/0097706 A1* | 4/2013 | Titonis | G06F 21/566 |
| | | | 726/22 |
| 2017/0249455 A1* | 8/2017 | Permeh | G06F 21/56 |
| 2018/0285567 A1* | 10/2018 | Raman | G06F 21/566 |
| 2018/0293381 A1 | 10/2018 | Tseng et al. | |
| 2019/0026460 A1* | 1/2019 | Robertson | G06F 21/53 |
| 2020/0036732 A1* | 1/2020 | Grubel | G06F 21/564 |
| 2020/0050686 A1* | 2/2020 | Kamalapuram | G06F 21/564 |
| 2020/0151360 A1* | 5/2020 | Zavesky | G06F 21/6218 |

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

UTILIZING MACHINE LEARNING FOR SMART QUARANTINING OF POTENTIALLY MALICIOUS FILES

CROSS-REFERENCE TO RELATED APPLICATION(S)

The present disclosure is a continuation of U.S. patent application Ser. No. 16/902,759, filed Jun. 16, 2020, and entitled "Utilizing Machine Learning for smart quarantining of potentially malicious files," which is a continuation-in-part of U.S. patent application Ser. No. 16/377,129, filed Apr. 5, 2019, and entitled "Prudent ensemble models in machine learning with high precision for use in network security," which is now U.S. Pat. No. 11,669,779, issued Jun. 6, 2023, the contents of each are incorporated by reference herein in their entirety.

FIELD OF THE DISCLOSURE

The present disclosure relates generally to networking and computing. More particularly, the present disclosure relates to systems and methods utilizing Machine Learning (ML) for smart quarantining of potentially malicious files, such as for scanning, sandboxing, etc. in a cloud-based system.

BACKGROUND OF THE DISCLOSURE

In network and computer security, the objective of any security system is to minimize the impact on User Experience (UX) such as by minimizing waiting time and/or latency, catching as many malicious files as possible to minimize the risk of infection, and minimizing cost/maximizing focus of file scanning by a sandbox. These three metrics—waiting time, risk, and cost—can be somewhat in opposition to one another. For example, risk can be significantly minimized if all files are scanned, but this increases waiting time and cost. Users are not keen to wait while every file is scanned and/or quarantined patiently. Further, waiting time and cost can be minimized by less scanning, but the risk is significantly increased. Thus, these three metrics are interrelated, and there is a need to balance each together. Also, Machine Learning (ML) techniques are proliferating and offer many use cases. In security, use cases for machine learning include malware detection, identifying malicious files for further processing such as in a sandbox, user or content risk determination, intrusion detection, etc. The general process includes training where a machine learning model is trained on a dataset, e.g., data including malicious and benign content or files, and, once trained, the machine learning model is used in production to classify unknown content based on the training.

There is an opportunity to apply machine learning techniques to file scanning, with the goal of balancing the three metrics—waiting time, risk, and cost.

BRIEF SUMMARY OF THE DISCLOSURE

The present disclosure relates to systems and methods utilizing Machine Learning (ML) for smart quarantining of files, such as for scanning, sandboxing, etc. in a cloud-based system. Specifically, the present disclosure presents a smart quarantine with a goal of minimizing the number of files quarantined, the number of malicious files passed through to an end user, and a number of files scanned by a sandbox. In minimizing each of these metrics, the smart quarantine provides better UX relative to conventional approaches, lower risk as the risky files are only scanned/quarantined, and lower cost as the sandbox only focused on files of interest as detected by machine learning. The present disclosure can be implemented in an antivirus program resident on a user device, in a standalone sandbox, in a security appliance, and/or through a cloud-based system offering security-as-a-service.

The systems and methods include obtaining a file associated with a user for processing; utilizing a combination of policy for the user and machine learning to determine whether to i) quarantine the file and scan the file in a sandbox, ii) allow the file to the user and scan the file in the sandbox, and iii) allow the file to the user without the scan; responsive to the quarantine of the file and the sandbox determining the file is malicious, blocking the file; and, responsive to the quarantine of the file and the sandbox determining the file is benign, allowing the file. The systems and methods can further include, responsive to the file being allowed and the sandbox determining the file is malicious, marking the file as malicious and blocking the file a next time.

The policy can be used to determine whether to i) quarantine and iii) allow, and the machine learning can be used to determine whether to ii) allow. The policy can be used to determine whether to iii) allow, and the machine learning can be used to determine whether to i) quarantine and ii) allow. The policy can be used to determine whether to iii) allow, and the machine learning can be used to determine whether to i) quarantine, ii) allow, and iii) allow. The machine learning can include a trained machine learning ensemble model configured to determine whether the file is malicious. The obtaining can be based on inline monitoring of the user by a cloud-based system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2A is a block diagram of a server that may be used in the cloud-based system of FIGS. 1A and 1B or the like;

FIG. 2B is a block diagram of a user device that may be used with the cloud-based system of FIGS. 1A and 1B or the like;

DETAILED DESCRIPTION OF THE DISCLOSURE

Again, the present disclosure relates to systems and methods utilizing Machine Learning (ML) for smart quarantining of files, such as for scanning, sandboxing, etc. in a cloud-based system. Specifically, the present disclosure presents a smart quarantine with a goal of minimizing the number of files quarantined, the number of malicious files passed through to an end user, and a number of files scanned by a sandbox. In minimizing each of these metrics, the smart quarantine provides better UX relative to conventional approaches, lower risk as the risky files are only scanned/quarantined, and lower cost as the sandbox only focused on files of interest as detected by machine learning. The present disclosure can be implemented in an antivirus program resident on a user device, in a standalone sandbox, in a security appliance, and/or through a cloud-based system offering security-as-a-service.

Example Cloud-Based System

Figure 1A:
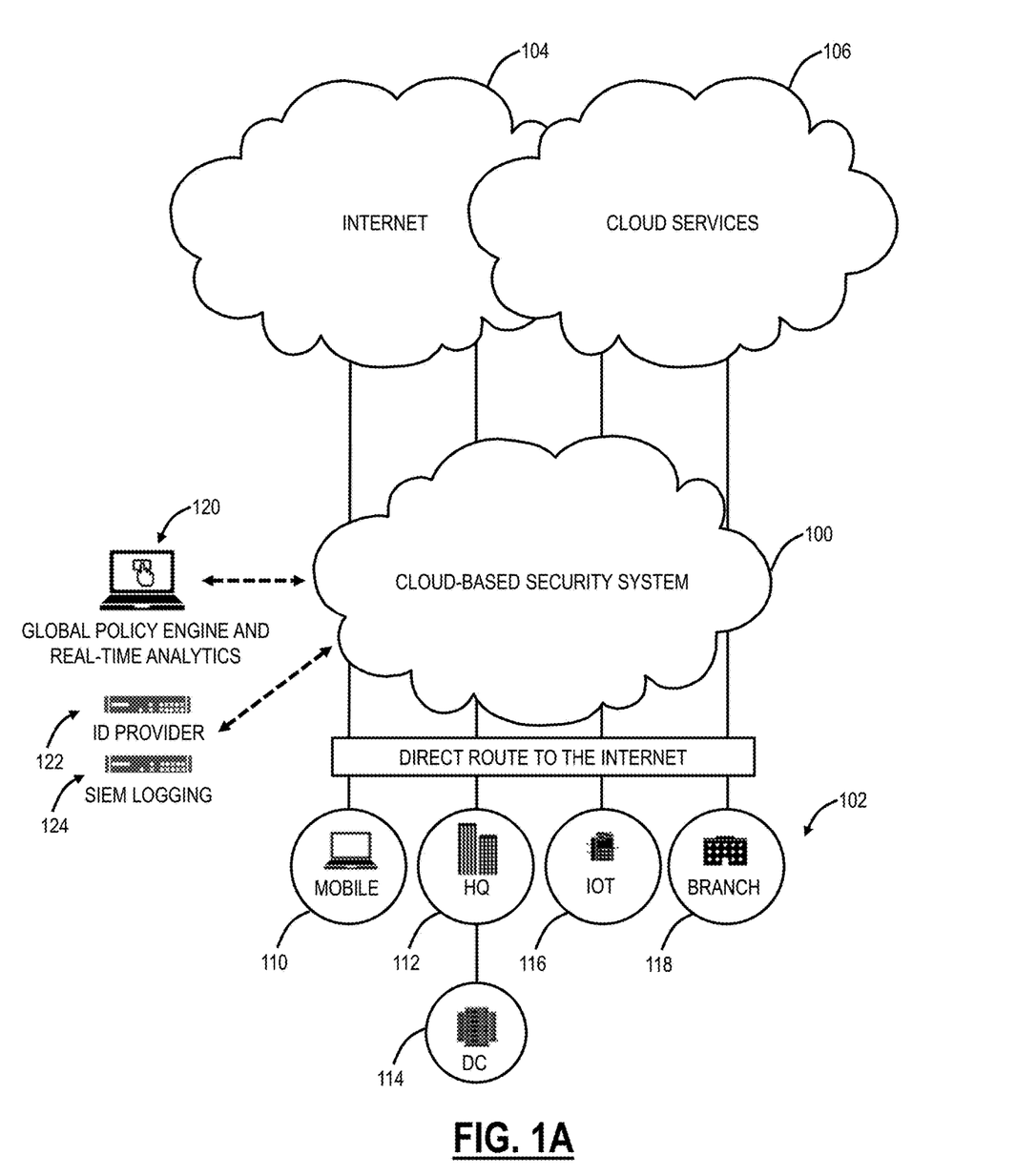
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

For illustration purposes, the users 102 of the cloud-based system 100 can include a mobile device 110, a headquarters (H.Q.) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the I.T. deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise I.T. administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (I.P.) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables I.T. administrators to have a unified view of user activity, threat intelligence, application usage, etc. For example, I.T. administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
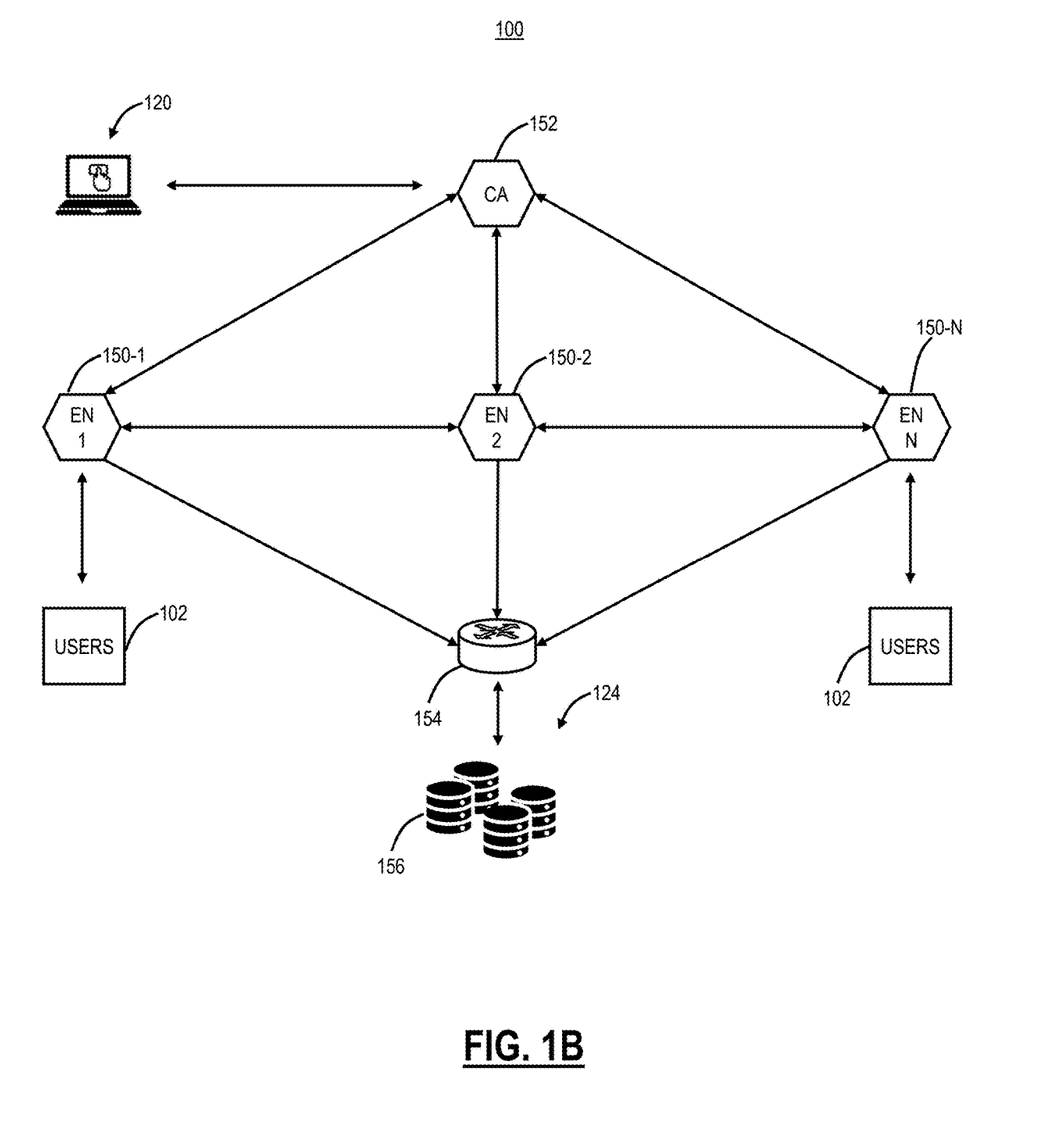
FIG. 1B is a network diagram of an example implementation of the cloud-based system.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (V.M.) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 2A:
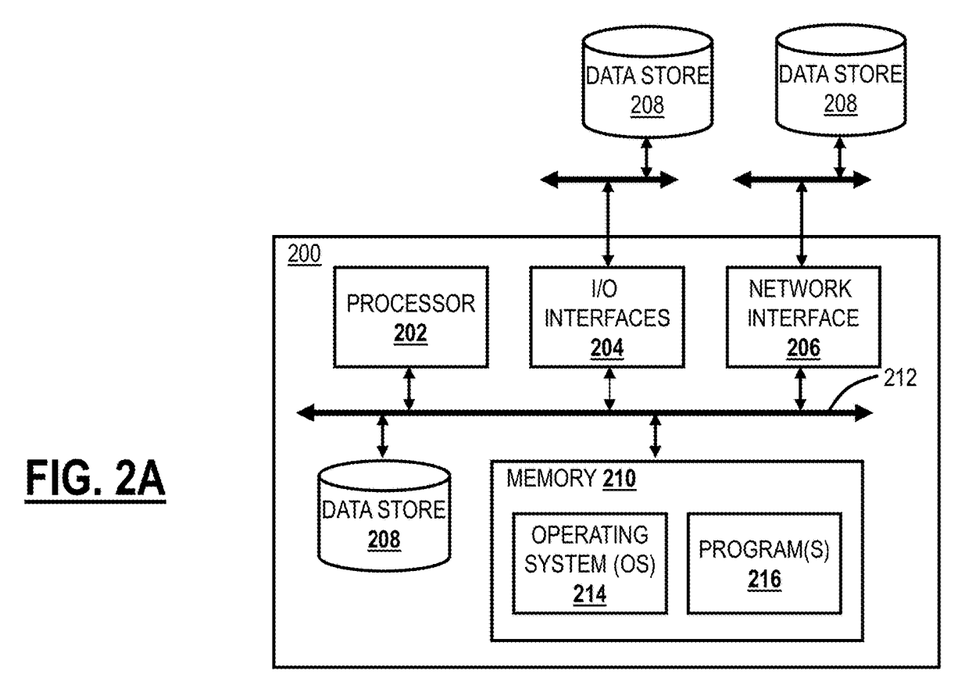

FIG. 2A is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2A depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 2B:
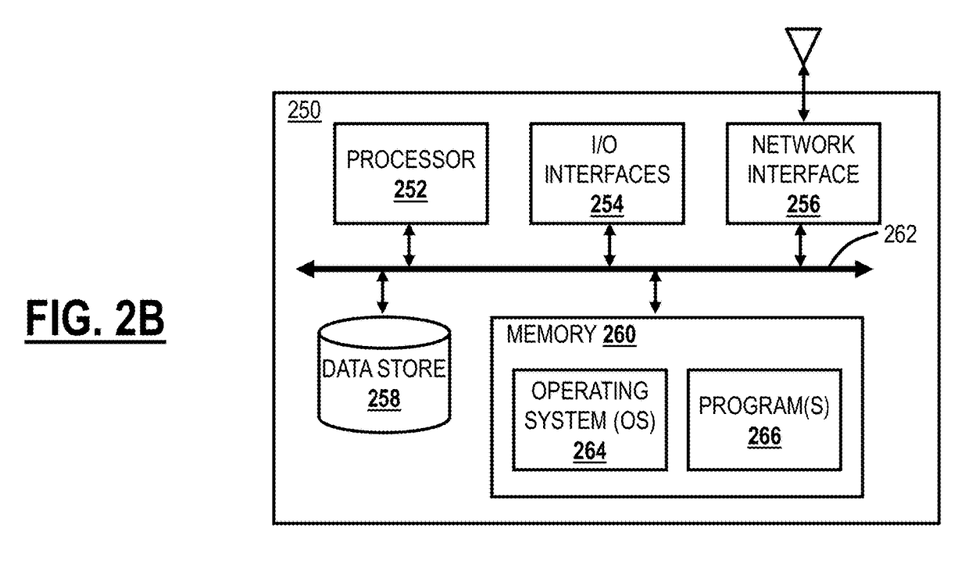

FIG. 2B is a block diagram of a user device 250, which may be used with the cloud-based system 100 or the like. Specifically, the user device 250 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 250 can be a digital device that, in terms of hardware architecture, generally includes a processor 252, I/O interfaces 254, a network interface 256, a data store 258, and memory 260. It should be appreciated by those of ordinary skill in the art that FIG. 2B depicts the user device 250 in an oversimplified manner, and a practical embodiment may include additional components and suitably configured processing logic to support known or conventional operating features that are not described in detail herein. The components (252, 254, 256, 258, and 252) are communicatively coupled via a local interface 262. The local interface 262 can be, for example, but not limited to, one or more buses or other wired or wireless connections, as is known in the art. The local interface 262 can have additional elements, which are omitted for simplicity, such as controllers, buffers (caches), drivers, repeaters, and receivers, among many others, to enable communications. Further, the local interface 262 may include address, control, and/or data connections to enable appropriate communications among the aforementioned components.

The processor 252 is a hardware device for executing software instructions. The processor 252 can be any custom made or commercially available processor, a CPU, an auxiliary processor among several processors associated with the user device 250, a semiconductor-based microprocessor (in the form of a microchip or chipset), or generally any device for executing software instructions. When the user device 250 is in operation, the processor 252 is configured to execute software stored within the memory 260, to communicate data to and from the memory 260, and to generally control operations of the user device 250 pursuant to the software instructions. In an embodiment, the processor 252 may include a mobile optimized processor such as optimized for power consumption and mobile applications. The I/O interfaces 254 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (L.C. D), touch screen, and the like.

The network interface 256 enables wireless communication to an external access device or network. Any number of suitable wireless data communication protocols, techniques, or methodologies can be supported by the network interface 256, including any protocols for wireless communication. The data store 258 may be used to store data. The data store 258 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 258 may incorporate electronic, magnetic, optical, and/or other types of storage media.

The memory 260 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 260 may incorporate electronic, magnetic, optical, and/or other types of storage media. Note that the memory 260 may have a distributed architecture, where various components are situated remotely from one another, but can be accessed by the processor 252. The software in memory 260 can include one or more software programs, each of which includes an ordered listing of executable instructions for implementing logical functions. In the example of FIG. 2B, the software in the memory 260 includes a suitable operating system 264 and programs 266. The operating system 264 essentially controls the execution of other computer programs and provides scheduling, input-output control, file and data management, memory management, and communication control and related services. The programs 266 may include various applications, add-ons, etc. configured to provide end user functionality with the user device 250. For example, example programs 266 may include, but not limited to, a web browser, social networking applications, streaming media applications, games, mapping and location applications, electronic mail applications, financial applications, and the like. In a typical example, the end-user typically uses one or more of the programs 266 along with a network such as the cloud-based system 100.

Machine Learning in Network Security

Machine learning can be used in various applications, including malware detection, intrusion detection, threat classification, the user or content risk, detecting malicious clients or bots, etc. In a particular use case, machine learning can be used on a content item, e.g., a file, to determine if further processing is required during inline processing in the cloud-based system 100. For example, machine learning can be used in conjunction with a sandbox to identify malicious files. A sandbox, as the name implies, is a safe environment where a file can be executed, opened, etc. for test purposes to determine whether the file is malicious or benign. It can take a sandbox around 10 minutes before it is fully determined whether the file is malicious or benign.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Of course, machine learning cannot replace the sandbox since malicious information from a static file is limited, while the sandbox can get a more accurate picture with dynamic behavior analysis. Further, it follows that the machine learning predictions require high precision due to the impact of a false prediction, i.e., finding a malicious file to be benign.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file, if mistakenly blocked due to an ML model's wrong verdict, would cause a life disaster. Similarly, undetected ransomware could cause problems for an enterprise. Therefore, there is a need for a high-precision approach for both benign and malicious files.

The conventional approach to improve precision includes improving the probability threshold to increase precision. A p-value (probability value) is a statistical assessment for measuring the reliability of a prediction, but this does not identify the unreliability of predictions with high probabilities.

A description utilizing machine learning in the context of malware detection is described in commonly-assigned U.S. patent application Ser. No. 15/946,546, filed Apr. 5, 2018, and entitled "System and method for malware detection on a per packet basis," the content of which is incorporated by reference herein. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Decision Tree

In an embodiment, a generated machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output probability. Generally, each of the one or more nodes leads to another node via a branch until a terminus is reached, and an output score is assigned.

Figure 3:
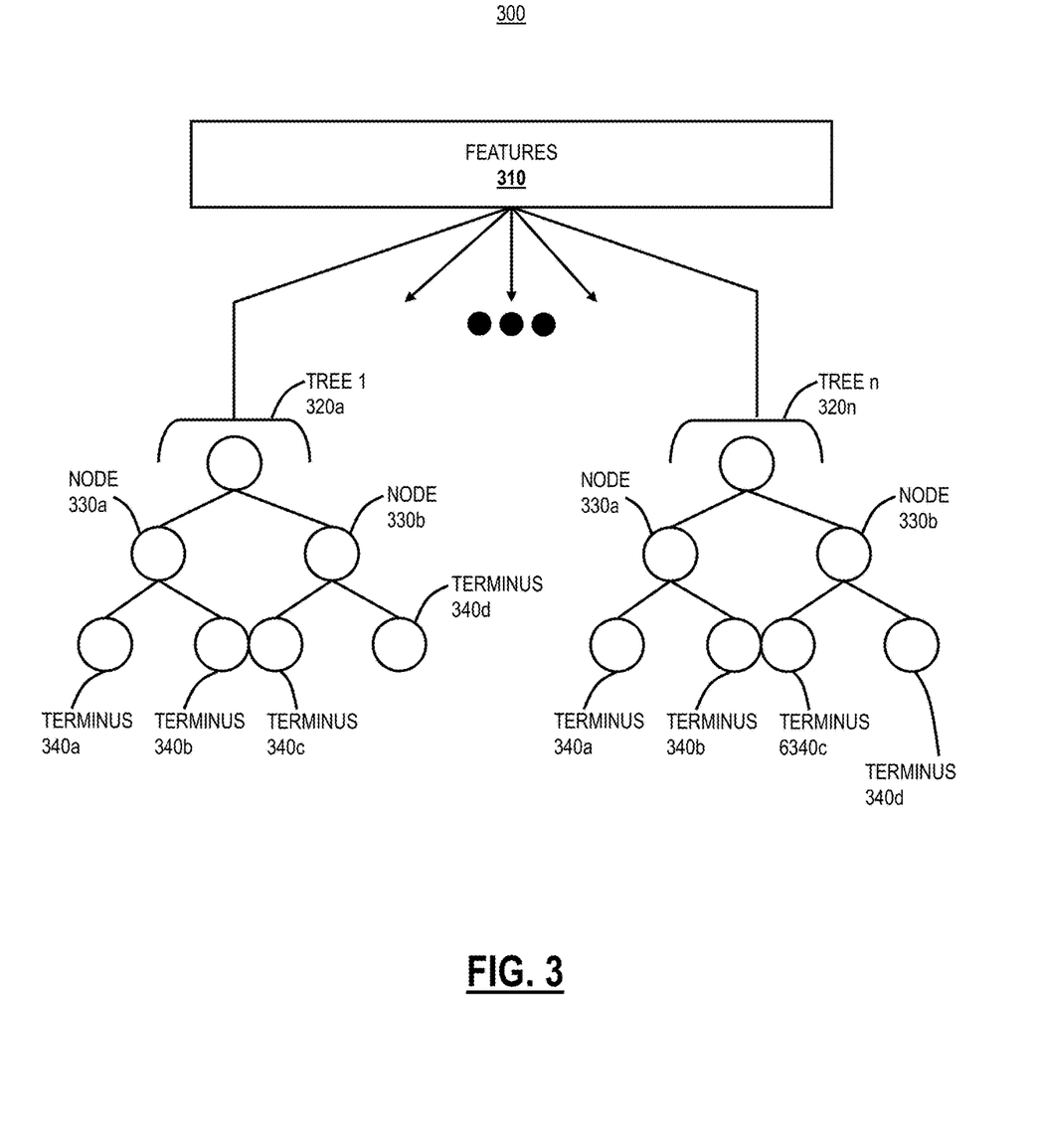
FIG. 3 is a diagram of a trained machine learning model in the form of a decision tree.

FIG. 3 is a diagram of a trained machine learning model 300. The machine learning model 300 includes one or more features 310 and multiple trees 320a, 320n. A feature is an individual measurable property or characteristic of a phenomenon being observed. The trees 320a, 320n can be decision trees associated with a random forest or a gradient boosting decision trees machine learning model. In various embodiments, the trees 320a, 320b are constructed during training. While the machine learning model 300 is only depicted as having trees 320a, 320n, in other embodiments, the machine learning model 300 includes a plurality of additional trees. The features 310, in the context of malicious file detection, relate to various properties or characteristics of the file.

The trees 320a, 320n include nodes 330a, 330b and termini 340a, 340b, 340c, 340d. That is, the node 330a is connected to termini 340a, 340b and the node 330b is connected to termini 340c, 340, via one or more branches. In other embodiments, the trees 320a, 320n include one or more additional nodes, one or more additional branches, and one or more additional termini. The nodes 330 each represent a feature and a decision boundary for that feature. The termini 340 can each be associated with a probability of maliciousness, in the example of malicious file detection. Generally, each of the one or more nodes leads to another node via a branch until a terminus is reached, and a probability of maliciousness is assigned. The output of the trained machine learning model 300 is a weighted average of a probability of maliciousness predicted by each of the trees 320a and the tree 320n.

Ensemble Models

Multiple different machine learning models can be used as an ensemble model that obtain better predictive performance than could be obtained from any of the constituent machine learning models alone. The individual models in an ensemble model could be tree-based (e.g., the decision tree used by gradient boosting decision trees and random forest) or neural networks or any other machine learning model where the prediction follows a decision path or activation path. For illustration purposes, the foregoing examples relate to decision trees.

The machine learning model 300 is an example of a decision tree. A decision tree is a tool that uses a tree-like model of decisions and their possible consequences, including chance event outcomes, resource costs, and utility. It is one way to display an algorithm that only contains conditional control statements, i.e., if . . . then . . . else. Random forests or random decision forests are an ensemble model for classification, regression and other tasks that operates by constructing a multitude of decision trees at training time and outputting the class that is the mode of the classes (classification) or mean prediction (regression) of the individual trees. Random decision forests correct for decision trees' habit of overfitting to their training set. Of note, each of the decision trees is independent of one another in the case of Random Forest. Gradient Boosting Decision Trees are dependent between one another. Gradient boosting is a machine learning technique for regression and classification problems, which produces a prediction model in the form of an ensemble of weak prediction models, typically a decision tree.

Blind Spots

Instance-based machine learning approaches make predictions based on its neighbor, that is, the examples similar to it. On the other hand, if no similar examples are surrounding the example under prediction, there is insufficient support for the prediction. Thus, the prediction is untrustworthy. An instance-based approach needs a similarity threshold to decide whether there are similar examples. However, the similarity is relative and not absolute. The similarity is also feature dependent. Again, blind spots in a machine learning model are regions in a feature space defined by ensemble trees where there is insufficient or conflicting evidence from previously seen data (e.g., training). Blind spots are the target of adversarial attacks where the models are fooled with malicious input. Machine learning models are unable to make accurate predictions at blind spots.

For an example of a blind spot, is broccoli more similar to cauliflower or kale? It is clear that from the shape perspective, broccoli is closer to cauliflower. While if the green color is the dominant feature, then broccoli becomes closer to kale. Thus, this model requires additional features as shape and color alone are not sufficient for distinguishing examples.

Prudent Ensemble Models

The present disclosure includes measuring the reliability of a prediction to provide confidence/over prediction. These reliability measures can also be double-checked and tracked to improve the measurement of reliability further. For example, in the malicious content item detection use case, the unreliability predictions could be doubled checked by a sandbox. The unreliability predictions can increase precision by filtering out unreliable predictions. If a prediction is made, it has very high precision. While for those, it is not sure, they can be analyzed further to identify malware concept drift or discrepancy in the data distribution.

Prudent Ensemble Model Process

Figure 4:
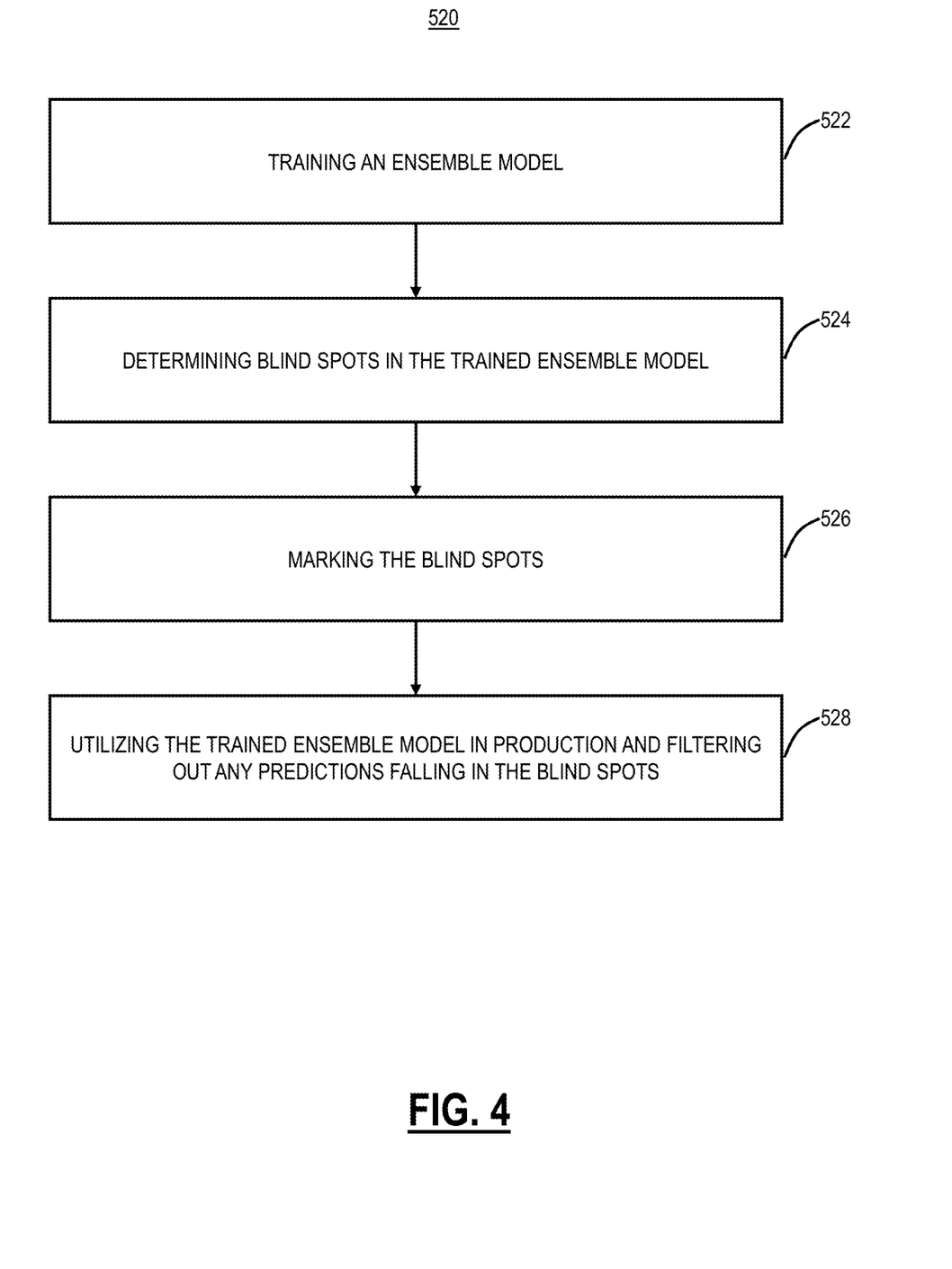
FIG. 4 is a flowchart of a prudent ensemble model process.

FIG. 4 is a flowchart of a prudent ensemble model process 520. The process 520 includes training an ensemble model (step 522). This step proceeds as is known in the machine learning art. As described herein, the ensemble model could be tree-based (e.g., the decision tree used by gradient boosting decision trees and random forest) or neural networks or any other machine learning model where the prediction follows a decision path or activation path.

The process 520 includes determining blind spots in the trained ensemble model (step 524). Again, a blind spot is a location where the trained ensemble model has not seen any examples with the combination of the features at the location or has examples with conflicting labels. The determined blind spots are marked or otherwise noted (step 526). The trained ensemble model is utilized in production to make predictions, but any predictions that are in marked blind spots are filtered out (ignored) as being unreliable (step 528).

Again, by filtering out unreliable predictions, that is, the predictions that fall into blind spots, the process 520 counters adversarial attacks, including those not just on decision boundary attack, but also those far away from the decision boundary. For example, a malicious file can be configured to fool the model by having characteristics similar to a benign content item, but still being malicious. The process 520 advantageously protects against such attacks as the malicious file that tries to fool the model will end up in a blind spot as such as file would not have existing examples. Accordingly, this file would be rejected due to the blind spot. The process 520 further achieves skyscraper high precision, and the process 520 increases the visibility of the trained ensemble model by explicitly exposing the vulnerable part of the model. The vulnerable part of the model can be improved through further training. The process 520 leverages the idea from instance-based (e.g., k-nearest neighbor) and integrates it into ensemble models to enhance their predictions.

The trained ensemble model uses learned models to define what are similar examples. Ensemble models non-linearly segment the feature space into small regions. Each region is the result of superimposing the decision paths from all sub-models. Examples within the same region are deemed similar. If the prediction paths for an example fall into a region where no examples have been seen previously or only examples with conflicting labels, that means it is a region without sufficient support from examples, thus named blind spots. The blind spots defined in this way can be anywhere in the feature space and do not have to near the decision boundary.

By filtering out predictions fell into blind spots, the process 520 can counter the adversary attack in various regions in feature space (not just those close to decision boundary). This is complementary to existing solutions for the adversarial attack. Since the adversarial examples generated using the existing data are limited. There are still blind spots remaining after the hardening of the model trained with adversary examples, especially those not close to the decision boundary.

Content Processing Process by an Inline Security System

Figure 5:
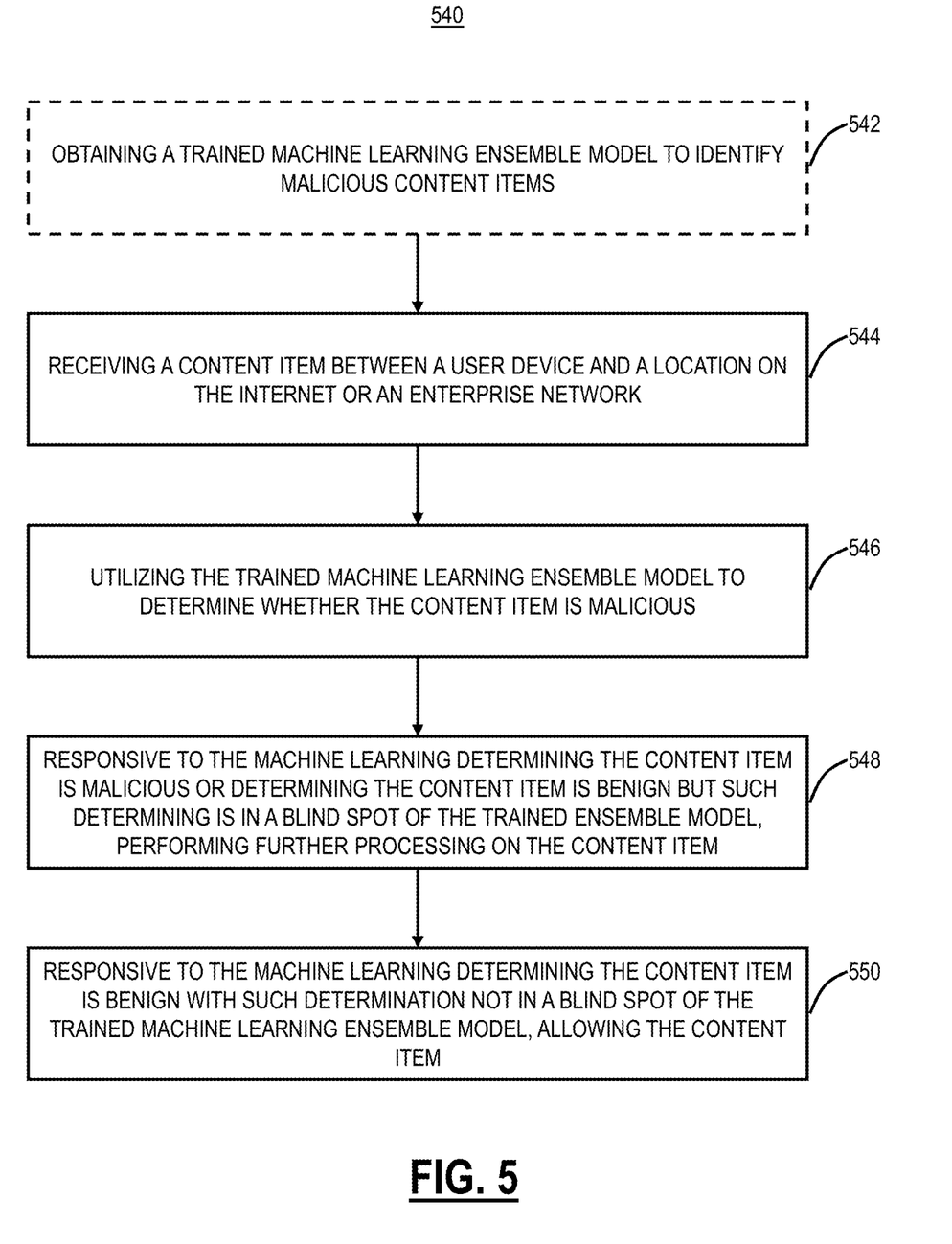
FIG. 5 is a flowchart of a content processing process, implemented by the cloud-based security system.

FIG. 5 is a flowchart of a content processing process 540, implemented by the cloud-based security system 100. The process 540 can include obtaining a trained machine learning ensemble model to identify malicious content items (step 542). The trained machine learning ensemble model can be from the process 520. The process 540 includes receiving a content item between a user device and a location on the Internet or an enterprise network (step 544), utilizing the trained machine learning ensemble model to determine whether the content item is malicious (step 546), responsive to the trained machine learning ensemble model determining the content item is malicious or determining the content item is benign but such determining is in a blind spot of the trained ensemble model, performing further processing on the content item (step 548), and, responsive to the trained machine learning ensemble model determining the content item is benign with such determination not in a blind spot of the trained machine learning ensemble model, allowing the content item (step 550).

As mentioned, the blind spot is a location where the trained machine learning ensemble model has not seen any examples with a combination of features at the location or has examples with conflicting labels. The process 540 can further include training the trained machine learning ensemble model to identify malicious content items and identifying and marking blind spots in the trained machine learning ensemble model. The process 540 can further include, subsequent to the further processing, one of allowing the content item and blocking the content item based on the further processing.

Further processing can include performing a dynamic analysis of the content item in a sandbox. For example, this can include the analysis described in U.S. Pat. No. 9,152,789, issued on Oct. 6, 2015, and entitled "Systems and methods for dynamic cloud-based malware behavior analysis," the contents of which are incorporated by reference herein. In an embodiment, the further processing includes blocking the content item in the cloud-based security system based on a classification by the trained machine learning ensemble model. Here, the trained machine learning ensemble model can be viewed as the final decision without requiring a sandbox or the like.

In an embodiment, the content item is malicious and configured to fool the trained machine learning ensemble model via an adversarial attack where the content item is configured to mimic benign features, and wherein the content item lands on a blind spot in the trained machine learning ensemble model thereby preventing the adversarial attack. The content item can be one of an executable file, a Portable Document File (PDF) file, a Microsoft Office file, and a JavaScript file. The cloud-based security system can be located inline between the user device and the location.

Smart Quarantine Approach

The present disclosure includes a smart quarantine approach where machine learning is utilized as a front-end to a scanning system to decide whether or not to scan a particular file. Again, the goal in such an approach is to minimize waiting time, risk, and cost. Of note, the smart quarantine approach is described herein with reference to the cloud-based system 100, offering a cloud security service. Those skilled in the art will recognize the smart quarantine approach contemplates use in other architectures, including in a stand-along software program executed on the user device 300, in a security appliance, in a router, in a Secure Web Gateway (SWG), in a Web proxy, etc.

Conventional Quarantine Process

Figure 6:
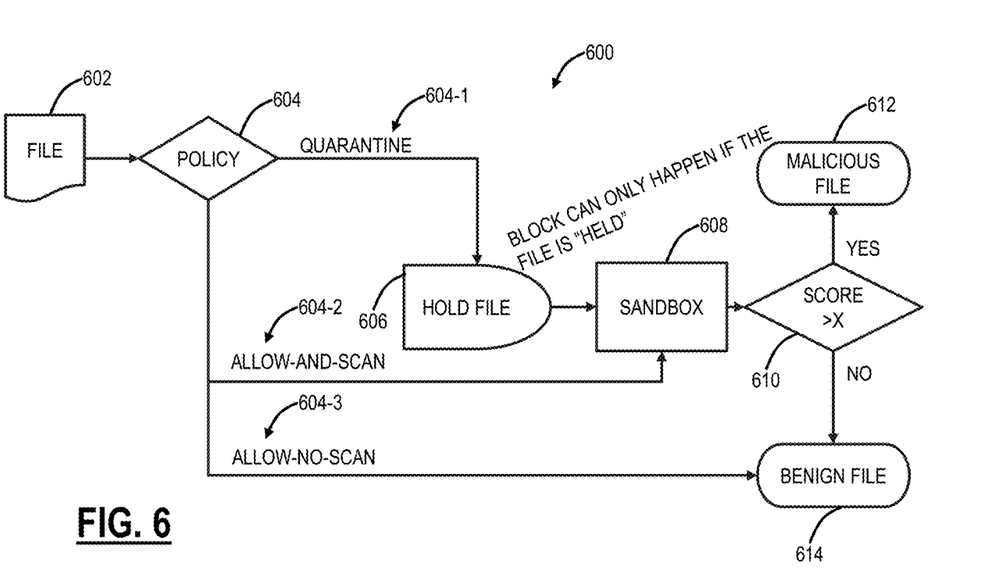
FIG. 6 is a flow diagram of a conventional quarantine process for quarantining, scanning, blocking, and allowing a file.

FIG. 6 is a flow diagram of a conventional quarantine process 600 for quarantining, scanning, blocking, and allowing a file 602. The file 602 can be a document (e.g., a Microsoft Office document or the like), a Portable Document Format (PDF), or an executable file (e.g., a Portable Executable (P.E.) file in 32 or 64-bit format). The file 602 is obtained, and then policy 604 determinates how the file 602 is processed, namely either quarantined (step 604-1), allowed and scanned (step 604-2), or allowed and not scanned (step 604-3). In the cloud-based system 100, the actions of quarantine and scanning may be separate. For example, a file may be blocked to the end user 102 in the cloud-based system 100 if it is held, i.e., quarantined (step 606). The file may be allowed to the end user 102 and simultaneously scanned by a sandbox (steps 604-2, 608). The result of the sandbox 608 is a score, and it can be used to determine whether the file 602 is malicious or benign (step 610). Again, the sandbox 608 is configured to run the file 602 in a controlled environment (i.e., a "sandbox") and perform observation and analysis to determine behavior. For example, there can be a scoring threshold, X, and a score above it means the file 602 is determined to be malicious (step 612), and a score below means the file 602 is determined to be benign (step 614).

The step 604-3 immediately allows the file 602 to the end user 102. The step 604-1 holds the file 602 (step 606), and the step 604-2 immediately allows the file 602 to the end user 102, but still performs scanning in the sandbox 608. For example, if the file 602 is malicious (step 612), but allowed at the step 604-2, the file 602 can be blocked the next time. If the file 602 is held (step 606) and the file 602 is malicious (step 612), the file 602 can be blocked, such as in the cloud-based system 100. If the file 602 is held (step 606) and found to be benign (step 614), the file 602 can be allowed to the end user 102.

Machine Learning Smart Quarantining Process

Figure 7:
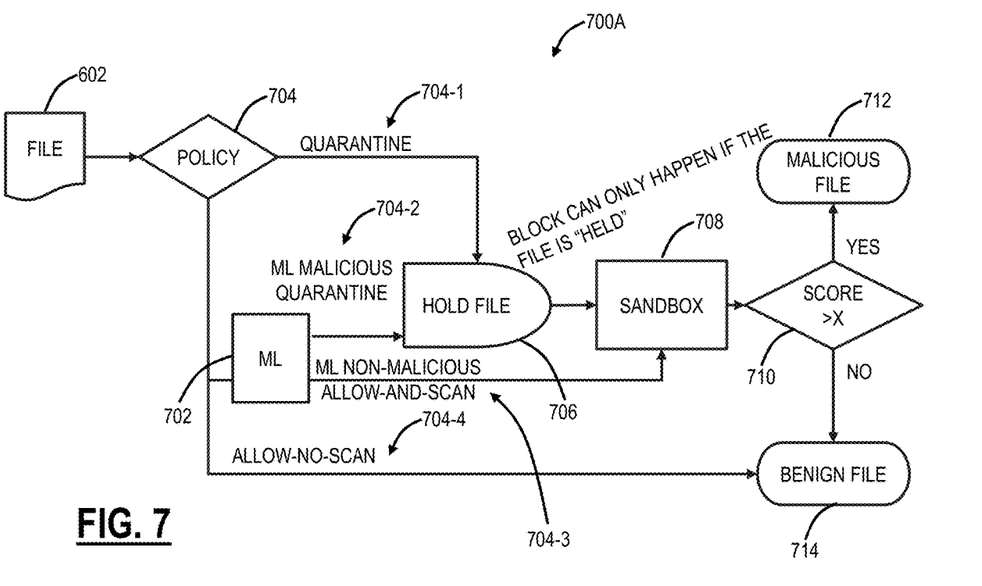
FIG. 7 is a flow diagram of a smart quarantine process for quarantining, scanning, blocking, and allowing a file, where machine learning is used to front end whether or not to hold the file.
Figure 8:
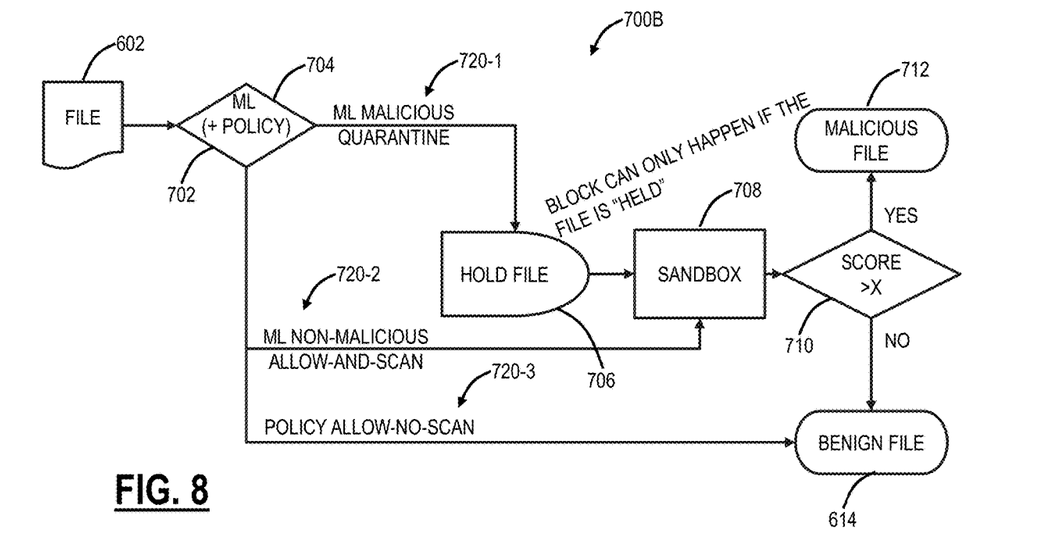
FIG. 8 is a flow diagram of a smart quarantine process for quarantining, scanning, blocking, and allowing a file, where machine learning is used to front end whether or not to hold or scan the file.
Figure 9:
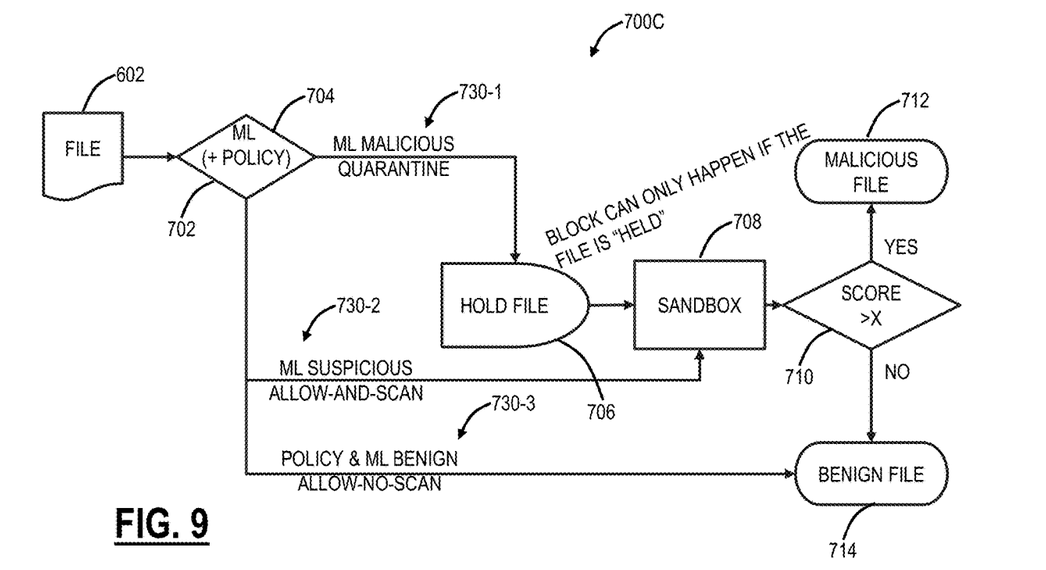
FIG. 9 is a flow diagram of a smart quarantine process for quarantining, scanning, blocking, and allowing a file, where machine learning is used to front end whether or not to hold, scan, or allow the file.

FIG. 7 is a flow diagram of a smart quarantine process 700A for quarantining, scanning, blocking, and allowing a file 602, where machine learning 702 is used to front end whether or not to hold the file 602. FIG. 8 is a flow diagram of a smart quarantine process 700B for quarantining, scanning, blocking, and allowing a file 602, where machine learning 702 is used to front end whether or not to hold or scan the file 602. FIG. 9 is a flow diagram of a smart quarantine process 700C for quarantining, scanning, blocking, and allowing a file 602, where machine learning 702 is used to front end whether or not to hold, scan, or allow the file 602.

In FIG. 7, the smart quarantine process 700A includes obtaining the file 602 and then policy 704 determinates how the file 602 is processed, either quarantined (step 704-1), processed by the machine learning 702 to determine whether to quarantine (step 704-2) or to allow and scan (step 704-3), or allowed without a scan (step 704-4). That is, in the smart quarantine process 700A, the machine learning 702 is used to front end the allow and scan step. Thus, in the smart quarantine process 700A, the allow and scan is now augmented to become quarantine if malicious from the machine learning 702 (step 704-2) or allow and scan if not malicious from the machine learning 702 (step 704-3).

Similar to the quarantine process 600, the smart quarantine process 700A includes holding the file 602 after the steps 704-1, 704-2 (step 706), and scanning the file 602 with a sandbox 708 after the steps 704-1, 704-2, 704-3. The sandbox 708 scores the file 602 (step 710), and the smart quarantine process 700A determines if the file 602 is malicious (step 712) or benign (step 714) based thereon. If the file was held (step 706), the smart quarantine process 700A can block the file 602 if malicious. Further, the smart quarantine process 700A also includes the step 704-4 of allowing without a scan based on the policy 704.

In FIG. 8, the smart quarantine process 700B includes combining the machine learning 702 with the policy 704. Here, the machine learning 702 front ends both the decision to quarantine and to allow and scan, not just the decision to allow and scan. Here, the smart quarantine process 700B can include three outputs of the combined machine learning 702 and policy 704, namely quarantine if the machine learning 702 determines the file 602 is malicious (step 720-1), allow and scan if the machine learning 702 determines the file 602 is not malicious (step 720-2), and allow without a scan if the policy 704 dictates for the file 602 (step 720-3). The remainder of the steps in the smart quarantine process 700B are the same as in the smart quarantine process 700A.

In FIG. 9, the smart quarantine process 700C also includes combining the machine learning 702 with the policy 704, but here the machine learning 702 output is used in all three decisions. The machine learning 702 front ends all the decisions, namely, quarantine if the machine learning 702 determines the file 602 is malicious (step 730-1), allow and scan if the machine learning 702 determines the file 602 is not malicious (step 730-2), and allow without a scan if the policy 704 dictates for the file 602 and if the machine learning 702 determines the file is benign (step 730-3). The remainder of the steps in the smart quarantine process 700C are the same as in the smart quarantine process 700A, 700B.

The machine learning 702 can include any of the techniques described herein. The policy 704 can be determined by a tenant associated with the user 102. For example, the policy 704 can be based on a type of the file 602, e.g., quarantine all executables, allow and scan all documents and PDFs, etc. The policy 704 can also be based on other factors such as user location, the user device 250 types, network access technique, etc.

The smart quarantine process 700A, 700B, 700C utilizes machine learning as a front end to decide whether or not to hold the file 602 (FIG. 7), whether or not to hold or scan the file 602 (FIG. 8), and whether or not to hold, scan, or allow the file 602 (FIG. 9). The smart quarantine processes 700A, 700B, 700C address the three metrics described herein—waiting time, cost, and risk. Specifically, the conventional quarantine process 600 has a baseline for each of these metrics. The smart quarantine processes 700A, 700B, 700C improves all of these metrics relative to the conventional quarantine process 600.

The smart quarantine processes 700A reduces risk relative to the conventional quarantine process 600 by utilizing the machine learning 702 to augment and improve the allow and scan step. Allow and scan is required for some files as the users 102 simply do not want every file 602 held for the sandbox 708. Thus, allow and scan poses some risk. The machine learning 702 can reduce this risk such that some of the files 602 that would be allowed and scanned are now held based on the determination of the machine learning 702.

The smart quarantine processes 700B both reduces the risk and the waiting time relative to the conventional quarantine process 600 by utilizing the machine learning 702 to augment and improve the allow and scan step and the quarantine step. Here, the smart quarantine processes 700B provides the same benefits as the smart quarantine processes 700A for the allow and scan step. Additionally, the smart quarantine processes 700B only holds the files 602 if the output of the machine learning 702 determines the file 602 is malicious, thereby reducing the number of files 602 that are held.

Finally, the smart quarantine processes 700C reduces the waiting time, the cost, and the risk relative to the conventional quarantine process 600 by utilizing the machine learning 702 to augment and improve the allow and scan step, the quarantine step, and the allow without scan step. Again, the smart quarantine processes 700C has the same benefits as the smart quarantine processes 700A, 700B. Additionally, the smart quarantine processes 700C further augments the allow without scan only where the machine learning 702 determines the file 602 is benign. Also, the sandbox is minimized as it only handles files determined as suspicious in the machine learning 702. Thus, the smart quarantine processes 700C reduces processing costs—the sandbox only has to address suspicious files 602.

EXPERIMENTAL RESULTS

The following table illustrates a set of data from actual monitoring in the cloud-based system 100, using the conventional quarantine process 600. Here, the files 602 include documents (M.S. document), PDF files, and PE 32/64 files. In the quarantine step 604-1, a total of 217,961 files were held, but only 1900 were malicious. Also, for the allow and scan step 604-2, a total of 2538 files were allowed, but eventually determined to be malicious after the scanning.

| policy | File type | malicious | benign | subtotal |
|---|---|---|---|---|
| quarantined | MS document | 9 | 59208 | 59217 |
|  | PDF | 0 | 104905 | 104905 |
|  | PE 32/64 | 1891 | 51948 | 53839 |
|  | All | 1900 | 216061 | 217961 |
| Allow and scan | MS document | 83 |  |  |
|  | PDF | 0 |  |  |
|  | PE 32/64 | 2455 |  |  |
|  | All | 2538 |  |  |

The following table illustrates the same set of data with the introduction of the machine learning 702. As can be seen in the above table, a lot of files 602 are held and scanned that may not have been necessary. In the below table, the machine learning 702 provides True Positives (T.P.) and False Positives (F.P.). Here, the machine learning 702 determines that only 3806 files should be held in quarantine, not 217,961.

| policy | File type | ML TP | ML FP | subtotal |
|---|---|---|---|---|
| All | MS document | 84 | 216 | 300 |
| | PDF | 0 | 22 | 22 |
| | PE 32/64 | 2973 | 511 | 3484 |
| | All | 3057 | 749 | 3806 |
| Allow and scan | MS document | 60 | 182 | 242 |
| | PDF | 0 | 17 | 17 |
| | PE 32/64 | 1366 | 253 | 1619 |
| | All | 1426 | 452 | 1878 |

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of sandboxing a file, the method comprising steps of:
responsive to receiving a file associated with a user via inline monitor ng of traffic associated with the user by a cloud-based system, obtaining policy for the user;
analyzing the file with a machine learning model; and
performing an action based on a combination of the policy for the user and a verdict of the machine learning model, wherein the action includes one of quarantining the file for analysis in a sandbox, allowing the file to the user, and allowing the file to the user in addition to analyzing the file in the sandbox, and wherein the combination includes the verdict from the machine learning model and whether the policy allows the file for the user, wherein the action is selected in real-time in the cloud-based system to minimize latency based on the inline monitoring.

2. The method of claim 1, wherein the verdict is one of malicious, suspicious, non-malicious, and benign.

3. The method of claim 2, wherein the quarantining is when the verdict is malicious.

4. The method of claim 1, wherein the steps further include:
responsive to the verdict being one of suspicious and non-malicious, allowing the file to the user; and
subsequent to the allowing the file to the user, analyzing the file in the sandbox.

5. The method of claim 1, wherein the steps further include:
subsequent to the analysis in the sandbox, allowing or blocking the file based on a score.

6. The method of claim 5, wherein the steps further include:
marking the file as malicious for blocking a next time based on the score.

7. The method of claim 1, wherein the policy is based on any of file type, user location, user device type, and network access technique.

8. The method of claim 1, wherein the steps further include:
storing verdicts for a plurality of files and associated results from the sandbox; and
updating training of the machine learning model based thereon.

9. A non-transitory computer-readable storage medium having computer-readable code stored thereon for programming one or more processors to perform steps of:
responsive to receiving a file associated with a user via inline monitoring of traffic associated with the user by a cloud-based system, obtaining policy for the user;
analyzing the file with a machine learning model; and
performing an action based on a combination of the policy for the user and a verdict of the machine learning model, wherein the action includes one of quarantining the file for analysis in a sandbox, allowing the file to the user, and allowing the file to the user in addition to analyzing the file in the sandbox, and wherein the combination includes the verdict from the machine learning model and whether the policy allows the file for the user, wherein the action is selected in real-time in the cloud-based system to minimize latency based on the inline monitoring.

10. The non-transitory computer-readable storage medium of claim 9, wherein the verdict is one of malicious, suspicious, non-malicious, and benign.

11. The non-transitory computer-readable storage medium of claim 10, wherein the quarantining is when the verdict is malicious.

12. The non-transitory computer-readable storage medium of claim 9, wherein the steps further include:
responsive to the verdict being one of suspicious and non-malicious, allowing the file to the user; and
subsequent to the allowing the file to the user, analyzing the file in the sandbox.

13. The non-transitory computer-readable storage medium of claim 9, wherein the steps further include:
subsequent to the analysis in the sandbox, allowing or blocking the file based on a score.

14. The non-transitory computer-readable storage medium of claim 13, wherein the steps further include:
marking the file as malicious for blocking a next time based on the score.

15. The non-transitory computer-readable storage medium of claim 9, wherein the policy is based on any of file type, user location, user device type, and network access technique.

16. The non-transitory computer-readable storage medium of claim 9, wherein the steps further include:
storing verdicts for a plurality of files and associated results from the sandbox; and
updating training of the machine learning model based thereon.

* * * * *